(12) United States Patent
Kim et al.

(10) Patent No.: US 11,334,754 B2
(45) Date of Patent: May 17, 2022

(54) APPARATUS AND METHOD FOR MONITORING OBJECT IN VEHICLE

(71) Applicant: LG Electronics Inc., Seoul (KR)

(72) Inventors: Hyun Kyu Kim, Seoul (KR); Ki Bong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 16/731,952

(22) Filed: Dec. 31, 2019

(65) Prior Publication Data
US 2021/0110184 A1 Apr. 15, 2021

(30) Foreign Application Priority Data

Oct. 11, 2019 (KR) .......................... 10-2019-0126195

(51) Int. Cl.
*G06K 9/00* (2022.01)
*G06K 9/20* (2006.01)
*G06K 9/46* (2006.01)
*G06Q 10/08* (2012.01)

(52) U.S. Cl.
CPC ..... *G06K 9/00845* (2013.01); *G06K 9/00255* (2013.01); *G06K 9/00281* (2013.01); *G06K 9/2018* (2013.01); *G06K 9/46* (2013.01); *G06Q 10/083* (2013.01)

(58) Field of Classification Search
None
See application file for complete search history.

(56) References Cited

U.S. PATENT DOCUMENTS

| 9,886,637 | B1 * | 2/2018 | Chan | G06K 9/6201 |
|---|---|---|---|---|
| 2016/0016663 | A1 * | 1/2016 | Stanek | G05D 1/0094 |
| | | | | 701/3 |
| 2016/0171319 | A1 * | 6/2016 | Nagai | G06K 9/00604 |
| | | | | 382/103 |
| 2018/0345980 | A1 * | 12/2018 | Morita | B60W 40/08 |
| 2020/0114931 | A1 * | 4/2020 | Rao | G06K 9/00892 |
| 2020/0151470 | A1 * | 5/2020 | Shen | G06K 9/00208 |
| 2021/0056306 | A1 * | 2/2021 | Hu | G06N 3/08 |

FOREIGN PATENT DOCUMENTS

KR 10-2009-0079658 7/2009

* cited by examiner

*Primary Examiner* — Oneal R Mistry
*Assistant Examiner* — Nicolas James Boyajian
(74) *Attorney, Agent, or Firm* — Fish & Richardson P.C.

(57) ABSTRACT

An apparatus and a method for monitoring an object in a vehicle which recognize a state of an object from a different type of image through an artificial intelligence algorithm are disclosed. The in-vehicle object monitoring apparatus is an apparatus which monitors an in-vehicle object by using a first image and a second image, and comprises: an interface configured to receive a first image generated by a first camera in a vehicle and a second image generated by a second camera in the vehicle; and a processor configured to, when it is determined that there is an object in each of the first image and the second image, extract the first feature information about the object from the first image, extract the second feature information about the object from the second image, and recognize a state of the object, based on the first feature information and the second feature information.

15 Claims, 10 Drawing Sheets

APPARATUS AND METHOD FOR MONITORING OBJECT IN VEHICLE

CROSS-REFERENCE TO RELATED APPLICATION

This application claims benefit of priority to Korean Patent Application No. 10-2019-0126195, filed on Oct. 11, 2019, the entire disclosure of which is incorporated herein by reference.

BACKGROUND

1. Technical Field

The present disclosure relates to an in-vehicle object monitoring apparatus and method which accurately recognize a state of an object in an image based on different types of images generated using various sensors.

2. Description of Related Art

Various cameras are used to obtain images of surroundings. For example, ultrasonic cameras using ultrasonic sensors, RGB (red, green, and blue) cameras using RGB sensors, and infrared radiation (IR) cameras using IR sensors are being utilized.

Sensors in ultrasonic cameras are useful for sensing transparent materials, liquids, surfaces having high reflectivity, or metal surfaces, but are not useful for identifying details of objects in images (for example, ears, eyes, mouth, and nose of a human, or a brand name of a product).

In contrast, when strong light is irradiated onto objects, it may be difficult for RGB cameras and IR cameras to precisely capture images of the objects. Further, depth information is not included in the images, thus it is difficult to identify distances (or positions) of the objects in the images.

The Related Art discloses a method for composing various types of images (for example, a visible ray image, an infrared image, and a millimeter wave image) in which two images among various types of images are composed in accordance with user selection, time, or weather. However, a state of an object in the image cannot be more accurately identified.

Therefore, a technology which is capable of accurately recognizing a state of an object in any environment by using various sensors is required.

RELATED ART DOCUMENTS

Patent Document

Related Art: Korean Unexamined Patent Application Publication No. 10-2009-0079658

SUMMARY OF THE INVENTION

An objective of an embodiment of the present disclosure is to easily recognize a state of an object in an image without being affected by environmental changes (for example, an environment in which when strong light is irradiated on an object, it is difficult for a specific sensor to recognize a material of the object) by composing partial areas in different types of images when different types of images are generated using various sensors (for example, an ultrasonic sensor, an RGB sensor, and an IR sensor) in a camera.

An objective of an embodiment of the present disclosure is to extract first feature information about an object from a first image, extract second feature information about the object from a second image, and match parts of the first image and the second image based on the first feature information and the second feature information when it is determined that there are objects in the first image generated by a first camera in a vehicle and the second image generated by the second camera in the vehicle, thereby accurately recognizing a state of the object.

An objective of an embodiment of the present disclosure is to recognize a position of an object in a space by extracting the position of the object from a first image.

An objective of an embodiment of the present disclosure is to prevent an accident in advance by generating an accident risk warning or to reduce battery consumption by controlling a backlight power source of a display in a vehicle based on a state of a driver, when a type of an object in a traveling vehicle is predicted as being a driver based on a first image and a second image and it is determined that an accident risk will occur based on the state of the driver.

Further, an objective of an embodiment of the present disclosure is to manage an amount of products provided in a space by recognizing a state of a moved object when it is confirmed that an object located in a predetermined space in a vehicle moves out of the space based on a first image and a second image.

According to an aspect of the present disclosure, an in-vehicle object monitoring apparatus which monitors an in-vehicle object by using a first image and a second image includes an interface configured to receive a first image generated by a first camera in a vehicle and a second image generated by a second camera in the vehicle; and a processor configured to, when it is determined that there is an object in each of the first image and the second image, extract first feature information about the object from the first image, extract second feature information about the object from the second image, and recognize a state of the object, based on the first feature information and the second feature information.

According to an embodiment of the present disclosure, the first camera may generate an ultrasonic image as the first image by using an ultrasonic sensor, and the second camera may generate an RGB (red, green, and blue) image or an infrared radiation (IR) image as the second image by using an RGB sensor or an IR sensor.

According to an embodiment of the present disclosure, the processor may apply an object type predicting algorithm to the first image and the second image to predict a type of the object, apply an object region estimating algorithm to the predicted type of the object together with the first image and the second image to estimate a variable region of the object, and apply an object feature extracting algorithm to the estimated variable region of the object to extract the first feature information and the second feature information.

According to an embodiment of the present disclosure, the object type predicting algorithm may be a neural network model which is trained to recognize the type of the object from at least one of the collected first image or second image, the object region estimating algorithm may be a neural network model which is trained to set the variable region corresponding to the object in the image based on the type of the object, and the object feature extracting algorithm may be a neural network model which is trained to recognize any one of the first feature information or the second feature information in the variable region corresponding to the object, based on a category in which the type of the image and the type of the object are classified.

According to an embodiment of the present disclosure, in accordance with the type of the object classified as being an active object capable of moving, the processor may extract, as the first feature information, a shape of the object in the first image and a first point corresponding to eyes, ears, mouth, and nose of the object; extract a second point corresponding to eyes, ears, mouth, and nose of the object in the second image as the second feature information; and recognize the state of the object by replacing an image corresponding to the first point in the first image with an image corresponding to the second point in the second image.

According to an embodiment of the present disclosure, based on the type of the object in the traveling vehicle is predicted as being a driver, when the driver gazing is recognized as being the state of the object and is out of a predetermined range for a predetermined period of time, the processor may issue accident risk warning.

According to an embodiment of the present disclosure, based on the type of the object in the traveling vehicle being a driver, whether the gaze of the driver is directed to a display in the vehicle, and a direction of the head of the driver, the processor may control a backlight power source of the display.

According to an embodiment of the present disclosure, in accordance with the type of the object classified as being a passive object not capable of moving, the processor may: extract, as the first feature information, a shape of the object in the first image and a first point corresponding to unique information of the object; extract, as the second feature information, a second point corresponding to the unique information of the object in the second image; and recognize the state of the object by replacing an image corresponding to the first point in the first image with an image corresponding to the second point in the second image.

According to an embodiment of the present disclosure, the unique information of the object may be a brand name.

According to an embodiment of the present disclosure, the interface may receive the first image and the second image at every predetermined time period from the first camera and the second camera, and when it is confirmed that the object, located in a space set in the vehicle, moves out of the space, based on the first image and the second image which are periodically received, the processor may recognize the state of the moved object.

According to an embodiment of the present disclosure, in accordance with the object disposed in the space not satisfying a reference set for every type, the processor may provide, identification information of the object corresponding to the type which does not satisfy the reference, to a shop terminal in a shop located within a distance set with respect to the vehicle; and cause a drone, which is installed in the vehicle, to move to the shop to obtain a product corresponding to the identification information of the object and supply the product to the vehicle.

According to an embodiment of the present disclosure, the processor may check a battery capacity of the drone, and when it is determined that the drone is capable of moving back and forth to the shop based on the battery capacity, move the drone to the shop.

According to an embodiment of the present disclosure, the processor may select a shop included in a route on which the vehicle travels, based on at least one of a traveling speed of the vehicle or a time duration of the drone making a round trip, and provide identification information of the object to a shop terminal of the selected shop.

According to another aspect of the present disclosure, a method which monitors an in-vehicle object by using a first image and a second image includes: receiving a first image generated by a first camera in a vehicle and a second image generated by a second camera in the vehicle; and in accordance with a determination that there is an object in each of the first image and the second image, extracting first feature information about the object from the first image, extracting second feature information about the object from the second image, and recognizing a state of the object, based on the first feature information and the second feature information.

According to an embodiment of the present disclosure, the method may further comprise: generating, by the first camera, an ultrasonic image as the first image, using an ultrasonic sensor, and generating, by the second camera, an RGB (red, green, and blue) image or an infrared radiation (IR) image as the second image, using an RGB sensor or an IR sensor.

According to an embodiment of the present disclosure, the recognizing of a state of an object may further include predicting a type of the object by applying an object type predicting algorithm to the first image and the second image, respectively, estimating a variable region of the object by applying an object region estimating algorithm to the predicted type of the object together with the first image and the second image, and extracting the first feature information and the second feature information by applying an object feature extracting algorithm to the estimated variable region of the object, respectively.

According to an embodiment of the present disclosure, in accordance with the type of the object classified as being an active object capable of moving, the recognizing of a state of an object may further include: extracting, as the first feature information, a shape of the object in the first image and a first point corresponding to eyes, ears, mouth, and nose of the object; extracting, as the second feature information, a second point corresponding to eyes, ears, mouth, and nose of the object in the second image; and recognizing the state of the object by replacing an image corresponding to the first point in the first image with an image corresponding to the second point in the second image.

According to an embodiment of the present disclosure, the recognizing of a state of an object may include, in accordance with the type of object classified as being a passive object not capable of moving, extracting a shape of the object in the first image and a first point corresponding to unique information of the object as the first feature information and extracting a second point corresponding to the unique information of the object in the second image as the second feature information, and recognizing the state of the object by replacing an image corresponding to the first point in the first image with an image corresponding to the second point in the second image.

According to an embodiment of the present disclosure, the recognizing of a state of an object may further include, when it is confirmed that the object located in a space set in the vehicle moves out of the space, based on the first image and the second image which are periodically received, recognizing the state of the moved object.

According to an embodiment of the present disclosure, after the recognizing of a state of an object, in accordance with the object disposed in the space not satisfying a reference set for every type, the in-vehicle object monitoring method may further include: providing, identification information of the object corresponding to the type which does not satisfy the reference, to a shop terminal in a shop located within a distance set from the vehicle; and moving a drone installed in the vehicle to the shop to obtain a product corresponding to the identification information of the object and supply the product to the vehicle.

Apart from those described above, another method and another system for implementing the present disclosure, and a computer-readable recording medium having a computer program stored therein to perform the method may be further provided.

Other aspects and features as well as those described above will become clear from the accompanying drawings, the claims, and the detailed description of the present disclosure.

According to the present disclosure, when different types of images are generated using various sensors (for example, an ultrasonic sensor, an RGB sensor, or an IR sensor) in a camera, a state of an object in an image may be easily recognized by composing partial areas in different types of images without being affected by environment changes (for example, an environment where when strong light is irradiated on an object, it is difficult for a specific sensor to recognize a material of the object).

According to the present disclosure, when it is determined that there are objects in the first image generated by a first camera in the vehicle and a second image generated by the second camera in the vehicle, first feature information about an object is extracted from a first image, second feature information about the object is extracted from a second image, and parts of the first image and the second image match based on the first feature information and the second feature information, thereby accurately recognizing a state of the object.

According to the present disclosure, a position of the object is extracted from the first image to recognize a position of the object on the space.

According to the present disclosure, when a type of an object in a traveling vehicle is predicted as being a driver based on the first image and the second image, and it is determined that there is a risk of accident based on the state of the driver, an accident may be prevented in advance by generating an accident risk warning or a backlight power source of a display in the vehicle is controlled based on the state of the driver to reduce battery consumption.

Further, according to the present disclosure, when it is confirmed that an object located in a predetermined space in the vehicle moves out of the space based on the first image and the second image, an amount of products in the space may be managed by recognizing a state of the moved object.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION

Figure 1:
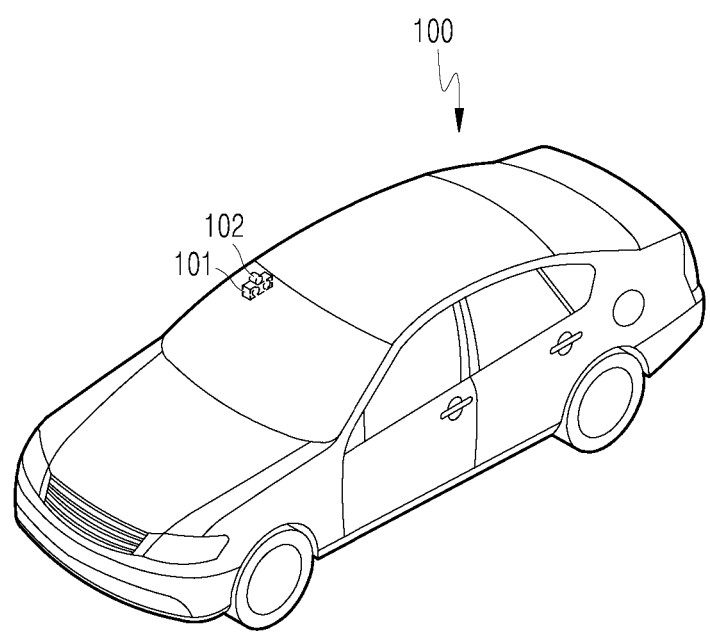
FIG. 1 is a view illustrating a vehicle to which an in-vehicle object monitoring apparatus according to an embodiment of the present disclosure is applied.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. Further, in the description of the embodiments of the present disclosure, when it is determined that the detailed description of the related art would obscure the gist of the present disclosure, the description thereof will be omitted. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are only used to distinguish one element from another.

Similarly, it will be understood that when an element is referred to as being "connected," "attached," or "coupled" to another element, it can be directly connected, attached, or coupled to the other element, or intervening elements may be present. In contrast, when an element is referred to as being "directly on," "directly engaged to," "directly connected to," or "directly coupled to" another element or layer, there may be no intervening elements or layers present.

As used herein, the singular forms "a," "an," and "the" are intended to include the plural forms as well, unless the context clearly indicates otherwise.

The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

Vehicles described in this specification may include all vehicles such as a motor vehicle having an engine as a power source, a hybrid vehicle having an engine and an electric motor as power sources, and an electric vehicle having an electric motor as a power source.

FIG. 1 is a view illustrating a vehicle to which an in-vehicle object monitoring apparatus according to an embodiment of the present disclosure is applied.

Referring to FIG. 1, in a vehicle 100 to which an in-vehicle object monitoring apparatus is applied, a first camera 101 and a second camera 102, which are different types, may be installed, and the first and second cameras may be installed in one or more locations (for example, an upper side of a front seat and an upper side of a rear seat in the vehicle).

Here, the first camera 101 may be an ultrasonic camera which generates an ultrasonic image by using an ultrasonic sensor. Further, the second camera 102 may be any one of an RGB (red, green, and blue) camera which generates an RGB image by using an RGB sensor, an infrared radiation (IR) camera which generates an IR image using an IR sensor, and a time of flight (TOF) camera which generates a TOF image using a TOF sensor.

The ultrasonic image may be a first image including depth information and the RGB image, the IR image, and the TOF image may be a second image which does not include depth information.

The in-vehicle object monitoring apparatus according to an embodiment of the present disclosure may be loaded in the vehicle 100 to receive a first image and a second image from the first camera 101 and the second camera 102, which photograph the inside of the vehicle 100 and monitor the inside of the vehicle, based on the first image and the second image. For example, the in-vehicle object monitoring apparatus identifies an object in the vehicle from the first image and the second image and provides various functions (for example, to generate an accident risk warning for the vehicle, to control a display power source in the vehicle, and to manage a product of a snack bar in the vehicle).

Figure 2:
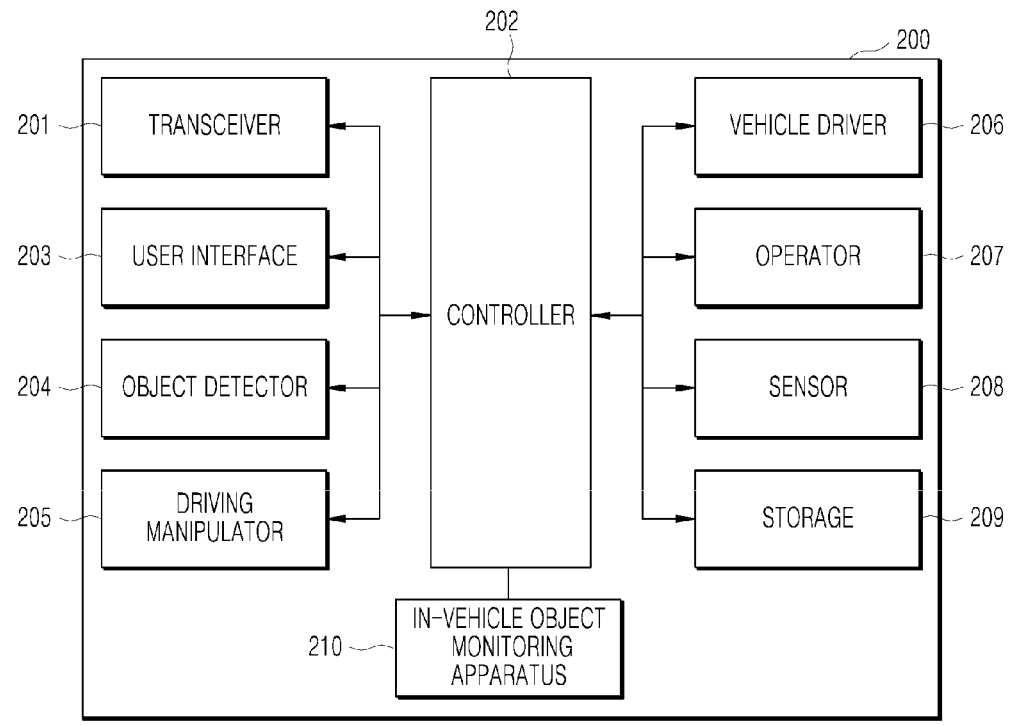
FIG. 2 is a block diagram illustrating a system to which an in-vehicle object monitoring apparatus according to an embodiment of the present disclosure is applied.

FIG. 2 is a block diagram illustrating a system to which an in-vehicle object monitoring apparatus according to an embodiment of the present disclosure is applied.

Referring to FIG. 2, a system 200, to which an in-vehicle object monitoring apparatus is applied, may be included in the vehicle 100 and includes a transceiver 201, a controller 202, a user interface 203, an object detector 204, a driving manipulator 205, a vehicle driver 206, an operator 207, a sensor 208, a storage 209, and an in-vehicle object monitoring apparatus 210.

According to an embodiment, the system to which the in-vehicle object monitoring apparatus is applied may include other components than components to be described below which are illustrated in FIG. 2 or does not include some of the components to be described below which are illustrated in FIG. 2.

The vehicle 100 may be switched from an autonomous mode to a manual mode, or switched from the manual mode to the autonomous mode depending on the driving situation. Here, the driving situation may be determined by at least one of the information received by the transceiver 201, the external object information detected by the object detector 204, or the navigation information acquired by the navigation module.

The vehicle 100 may be switched from the autonomous mode to the manual mode, or from the manual mode to the autonomous mode, according to a user input received through the user interface 203.

When the vehicle 100 is operated in the autonomous driving mode, the vehicle 100 may be operated under the control of the operator 207 that controls driving, parking, and unparking. When the vehicle 100 is operated in the manual mode, the vehicle 100 may be operated by an input of the driver's mechanical driving operation.

The transceiver 201 is a module for performing communication with an external device. Here, the external device may be a user terminal, another vehicle, or a server.

The transceiver 201 may include at least one of a transmission antenna, a reception antenna, a radio frequency (RF) circuit capable of implementing various communication protocols, or an RF element in order to perform communication.

The transceiver 201 may perform short range communication, GPS signal reception, V2X communication, optical communication, broadcast transmission/reception, and intelligent transport systems (ITS) communication functions.

The transceiver 201 may further support other functions than the functions described, or may not support some of the functions described, depending on the embodiment.

The transceiver 201 may support short-range communication by using at least one of Bluetooth, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB) technologies.

The vehicle transceiver 1100 may form short-range wireless communication networks so as to perform short-range communication between the vehicle 100 and at least one external device.

The transceiver 201 may include a Global Positioning System (GPS) module or a Differential Global Positioning System (DGPS) module for obtaining location information of the vehicle 100.

The transceiver 201 may include a module for supporting wireless communication between the vehicle 100 and a server (V2I: vehicle to infrastructure), communication with another vehicle (V2V: vehicle to vehicle) or communication with a pedestrian (V2P: vehicle to pedestrian). That is, the vehicle transceiver 1100 may include a V2X communication module. The V2X communication module may include an RF circuit capable of implementing V2I, V2V, and V2P communication protocols.

The transceiver 201 may receive a danger information broadcast signal transmitted by another vehicle through the V2X communication module, and may transmit a danger information inquiry signal and receive a danger information response signal in response thereto.

The transceiver 201 may include an optical communication module for communicating with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the vehicle 100.

The transceiver 201 may include a broadcast communication module for receiving broadcast signals from an external broadcast management server, or transmitting broadcast signals to the broadcast management server through broadcast channels. The broadcast channel may include a satellite channel and a terrestrial channel. Examples of the broadcast signal may include a TV broadcast signal, a radio broadcast signal, and a data broadcast signal.

The transceiver 201 may include an ITS communication module that exchanges information, data or signals with a traffic system. The ITS communication module may provide acquired information and data to the traffic system. The ITS communication module may receive information, data, or signals from the traffic system. For example, the ITS communication module may receive road traffic information from the traffic system, and provide the information to the controller 202. For example, the ITS communication module may receive a control signal from the traffic system, and provide the control signal to the controller 202 or a processor provided in the vehicle 100.

Depending on the embodiment, the overall operation of each module of the transceiver 201 may be controlled by a separate processor provided in the transceiver 201. The transceiver 201 may include a plurality of processors, or may not include a processor. When the transceiver 201 does not include a processor, the transceiver 201 may be operated under the control of the processor of another device in the vehicle 100 or the controller 202.

The transceiver 201 may implement a vehicle display device together with the user interface 203. In this case, the vehicle display device may be referred to as a telematics device or an audio video navigation (AVN) device.

Figure 3:
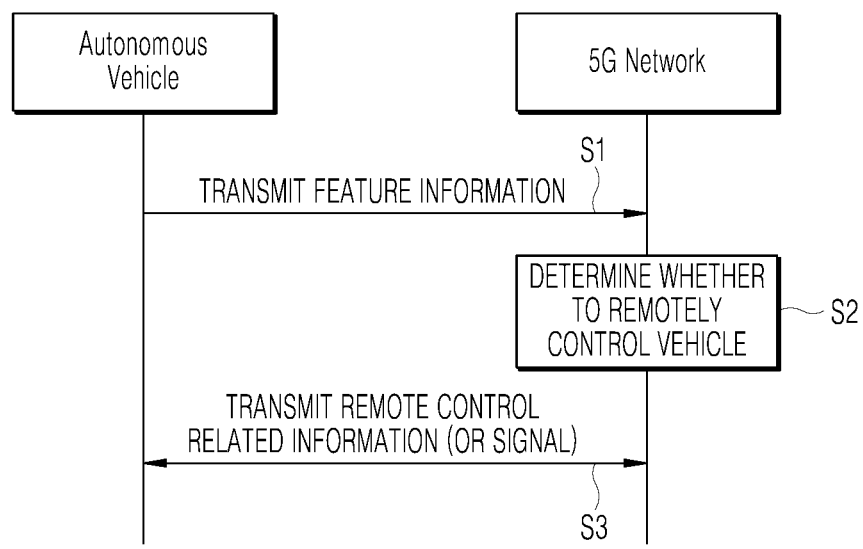
FIG. 3 is a diagram illustrating an example of a basic operation of an autonomous vehicle and a 5G network in a 5G communication system.

FIG. 3 is a diagram illustrating an example of the basic operation of an autonomous vehicle and a 5G network in a 5G communication system.

The transceiver 201 may transmit specific information to the 5G network when the vehicle 100 is operated in the autonomous mode.

In this case, the specific information may include autonomous driving-related information.

The autonomous driving-related information may be information directly related to driving control of the vehicle. For example, the autonomous driving-related information may include one or more of object data indicating an object around the vehicle, map data, vehicle state data, vehicle location data, and driving plan data.

The autonomous driving-related information may further include service information required for autonomous driving. For example, the specific information may include information on a destination inputted through the user interface 203 and a safety rating of the vehicle.

In addition, the 5G network may determine whether the vehicle is remotely controlled (S2).

Here, the 5G network may include a server or a module which performs remote control related to autonomous driving.

The 5G network may transmit information (or a signal) related to the remote control to an autonomous vehicle.

As described above, information related to the remote control may be a signal directly applied to the autonomous vehicle, and may further include service information necessary for autonomous driving. The autonomous vehicle according to this embodiment may receive service information such as insurance for each interval selected on a driving route and risk interval information, through a server connected to the 5G network to provide services related to the autonomous driving.

The vehicle 100 is connected to an external server through a communication network, and is capable of moving along a predetermined route without driver intervention using the autonomous driving technology.

In the following embodiments, the user may be interpreted as a driver, a passenger, or the owner of a user terminal.

When the vehicle 100 is traveling in the autonomous mode, the type and frequency of accidents may vary greatly depending on the ability to sense the surrounding risk factors in real time. The route to the destination may include sectors having different levels of risk due to various causes such as weather, terrain characteristics, traffic congestion, and the like.

At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 100 may operate in association with at least one AI module or robot included in the vehicle 100, during autonomous driving.

For example, the vehicle 100 may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 100 to a final destination. For example, the robot may perform a function of providing route guidance to a final destination to a user who alights from the vehicle 100. For example, the robot may perform a function of transporting the user who alights from the vehicle 100 to the final destination At least one electronic apparatus included in the vehicle 100 may communicate with the robot through a communication device.

At least one electronic apparatus included in the vehicle 100 may provide, to the robot, data processed by the at least one electronic apparatus included in the vehicle 100. For example, at least one electronic apparatus included in the vehicle 100 may provide, to the robot, at least one among object data indicating an object near the vehicle, HD map data, vehicle state data, vehicle position data, and driving plan data.

At least one electronic apparatus included in the vehicle 100 may receive, from the robot, data processed by the robot. At least one electronic apparatus included in the vehicle 100 may receive at least one among sensing data sensed by the robot, object data, robot state data, robot location data, and robot movement plan data.

At least one electronic apparatus included in the vehicle 100 may generate a control signal based on data received from the robot. For example, at least one electronic apparatus included in the vehicle may compare information on the object generated by an object detection device with information on the object generated by the robot, and generate a control signal based on the comparison result. At least one electronic device included in the vehicle 100 may generate a control signal so as to prevent interference between the route of the vehicle and the route of the robot.

At least one electronic apparatus included in the vehicle 100 may include a software module or a hardware module for implementing an artificial intelligence (AI) (hereinafter referred to as an artificial intelligence module). At least one electronic device included in the vehicle may input the acquired data to the AI module, and use the data which is outputted from the AI module.

The artificial intelligence module may perform machine learning of input data by using at least one artificial neural network (ANN). The artificial intelligence module may output driving plan data through machine learning of input data.

At least one electronic apparatus included in the vehicle 100 may generate a control signal based on the data outputted from the artificial intelligence module.

According to the embodiment, at least one electronic apparatus included in the vehicle 100 may receive data processed by an artificial intelligence from an external device through a communication device. At least one electronic apparatus included in the vehicle may generate a control signal based on the data processed by the artificial intelligence.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

The controller 202 may be implemented by using at least one of an application specific integrated circuit (ASIC), a digital signal processor (DSP), a digital signal processing device (DSP), a programmable logic device (PLD), a field programmable gate array (FPGA), a processor, a controller, a micro-controller, a microprocessor, or other electronic units for performing other functions.

The user interface 203 is used for communication between the vehicle 100 and the vehicle user. The user interface 203 may receive an input signal of the user, transmit the received input signal to the controller 202, and provide information held by the vehicle 100 to the user by the control of the controller 202. The user interface 203 may include, but is not limited to, an input module, an internal camera, a bio-sensing module, and an output module.

The input module is for receiving information from a user. The data collected by the input module may be analyzed by the controller 202 and processed by the user's control command.

The input module may receive the destination of the vehicle 100 from the user and provide the destination to the controller 202.

The input module may input to the vehicle controller 202 a signal for designating and deactivating at least one of the plurality of sensor modules of the object detector 204 according to the user's input.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or an image.

The output module may include at least one of a display module, an acoustic output module, and a haptic output module.

The display module may display graphic objects corresponding to various information.

The display module may including at least one of a liquid crystal display (LCD), a thin film transistor liquid crystal display (TFT LCD), an organic light emitting diode (OLED), a flexible display, a 3D display, or an e-ink display.

The display module may form an interactive layer structure with a touch input module, or may be integrally formed with the touch input module to implement a touch screen.

The display module may be implemented as a head up display (HUD). When the display module is implemented as an HUD, the display module may include a project module, and output information through an image projected onto a windshield or a window.

The display module may include a transparent display. The transparent display may be attached to the windshield or the window.

The transparent display may display a predetermined screen with a predetermined transparency. The transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The user interface 203 may include a plurality of display modules.

The display module may be disposed on one area of a steering wheel, one area of an instrument panel, one area of a seat, one area of each pillar, one area of a door, one area of a center console, one area of a head lining, or one area of a sun visor, or may be implemented on one area of a windshield or one area of a window.

The sound output module may convert an electric signal provided from the controller 202 into an audio signal, and output the audio signal. To this end, the sound output module may include one or more speakers.

The haptic output module may generate a tactile output. For example, the haptic output module may operate to allow the user to perceive the output by vibrating a steering wheel, a seat belt, and a seat.

The object detector 204 is for detecting an object located outside the vehicle 100. The object detector 204 may generate object information based on the sensing data, and transmit the generated object information to the vehicle controller 202. Examples of the object may include various objects related to the driving of the vehicle 100, such as a lane, another vehicle, a pedestrian, a motorcycle, a traffic signal, light, a road, a structure, a speed bump, a landmark, and an animal.

The object detector 204 is a plurality of sensor modules and may include a camera module, a lidar, an ultrasonic sensor, a radar 1450, and an IR sensor as a plurality of image capturers.

The object detector 204 may sense environmental information around the vehicle 100 through a plurality of sensor modules.

Depending on the embodiment, the object detector 204 may further include components other than the components described, or may not include some of the components described.

The radar may include an electromagnetic wave transmitting module and an electromagnetic wave receiving module. The radar may be implemented using a pulse radar method or a continuous wave radar method in terms of radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) method or a phase-shift method using an electromagnetic wave as a medium, and detect the location of the detected object, the distance to the detected object, and the relative speed of the detected object.

The radar may be disposed at an appropriate location outside the vehicle for sensing an object disposed at the front, back, or side of the vehicle.

The lidar may include a laser transmitting module, and a laser receiving module. The lidar may be embodied using the time of flight (TOF) method or in the phase-shift method.

The lidar may be embodied in a driving method or a non-driving method.

When the lidar is embodied in the driving method, the lidar may rotate by means of a motor, and detect an object near the vehicle 100. When the lidar is implemented in the non-driving method, the lidar may detect an object within a predetermined range with respect to the vehicle 100 by means of light steering. The vehicle 100 may include a plurality of non-driven type lidars.

The lidar may detect an object using the time of flight (TOF) method or the phase-shift method using laser light as a medium, and detect the location of the detected object, the distance from the detected object and the relative speed of the detected object.

The lidar may be disposed at an appropriate location outside the vehicle for sensing an object disposed at the front, back, or side of the vehicle.

The image capturer may be disposed at a suitable place outside the vehicle, for example, the front, back, right side mirrors and the left side mirror of the vehicle, in order to acquire a vehicle exterior image. The image capturer may be a mono camera, but is not limited thereto. The image capturer may be a stereo camera, an around view monitoring (AVM) camera, or a 360-degree camera.

The image capturer may be disposed close to the front windshield in the interior of the vehicle in order to acquire an image of the front of the vehicle. The image capturer may be disposed around the front bumper or the radiator grill.

The image capturer may be disposed close to the rear glass in the interior of the vehicle in order to acquire an image of the back of the vehicle. The image capturer may be disposed around the rear bumper, the trunk, or the tail gate.

The image capturer may be disposed close to at least one of the side windows in the interior of the vehicle in order to acquire an image of the side of the vehicle. In addition, the image capturer may be disposed around the fender or the door.

The image capturer may provide the captured image to the controller 202.

The ultrasonic sensor may include an ultrasonic transmitting module, and an ultrasonic receiving module. The ultrasonic sensor may detect an object based on ultrasonic waves, and detect the location of the detected object, the distance from the detected object, and the relative speed of the detected object.

The ultrasonic sensor may be disposed at an appropriate position outside the vehicle for sensing an object at the front, back, or side of the vehicle.

The infrared sensor may include an infrared transmitting module, and an infrared receiving module. The infrared sensor may detect an object based on infrared light, and detect the location of the detected object, the distance from the detected object, and the relative speed of the detected object.

The infrared sensor may be disposed at an appropriate position outside the vehicle for sensing an object at the front, back, or side of the vehicle.

The controller 202 may control the overall operation of the object detector 204.

The controller 202 may compare data sensed by the radar, the lidar, the ultrasonic sensor, and the infrared sensor with pre-stored data so as to detect or classify an object.

The controller 202 may detect and track objects based on the acquired image. The controller 202 may perform operations such as calculating a distance to an object and calculating a relative speed with respect to the object through an image processing algorithm.

For example, the controller 202 may acquire information on the distance to the object and information on the relative speed with respect to the object on the basis of variation of the object size with time in the acquired image.

For example, the controller 202 may obtain information on the distance to the object and information on the relative speed through, for example, a pin hole model and road surface profiling.

The controller 202 may detect and track the object based on the reflected electromagnetic wave that is reflected by the object and returned to the object after being transmitted. The controller 202 may perform operations such as calculating a distance to an object and calculating a relative speed of the object based on the electromagnetic wave.

The controller 202 may detect and track the object based on the reflected laser beam that is reflected by the object and returned to the object after being transmitted. The controller 202 may perform operations such as calculating a distance to an object and calculating a relative speed of the object based on the laser beam.

The controller 202 may detect and track the object based on the reflected ultrasonic wave that is reflected by the object and returned to the object after being transmitted. The controller 202 may perform operations such as calculating a distance to an object and calculating a relative speed of the object based on the ultrasonic wave.

The controller 202 may detect and track the object based on the reflected infrared light that is reflected by the object and returned to the object after being transmitted. The controller 202 may perform operations such as calculating a distance to an object and calculating a relative speed of the object based on the infrared light.

Depending on the embodiment, the object detector 204 may include a separate processor from the controller 202. In addition, the radar, the lidar, the ultrasonic sensor, and the infrared sensor may each include a processor.

When a processor is included in the object detector 204, the object detector 204 may be operated under the control of the processor controlled by the controller 202.

The driving controller 205 may receive a user input for driving. In the case of the manual mode, the vehicle 100 may operate based on the signal provided by the driving controller 205.

The vehicle driver 206 may electrically control the driving of various apparatuses in the vehicle 100. The vehicle driver 206 may electrically control the operations of a power train, a chassis, a door/window, a safety device, a lamp, and an air conditioner in the vehicle 100.

The operator 207 may control various operations of the vehicle 100. The operator 207 may be operated in an autonomous driving mode.

The operator 207 may include a driving module, an unparking module, and a parking module.

Depending on the embodiment, the operator 207 may further include constituent elements other than the constituent elements to be described, or may not include some of the constitute elements.

The operator 207 may include a processor under the control of the controller 202. Each module of the operator 207 may include a processor individually.

Depending on the embodiment, when the operator 207 is implemented as software, it may be a sub-concept of the controller 202.

The driving module may perform driving of the vehicle 100.

The driving module may receive object information from the object detector 204, and provide a control signal to a vehicle driving module to perform the driving of the vehicle 100.

The driving module may receive a signal from an external device through the transceiver 201, and provide a control signal to the vehicle driving module, so that the driving of the vehicle 100 may be performed.

The unparking module may perform unparking of the vehicle 100.

The unparking module may receive navigation information from the navigation module, and provide a control signal to the vehicle driving module to perform the departure of the vehicle 100.

In the unparking module, object information may be received from the object detector 204, and a control signal may be provided to the vehicle driving module, so that the unparking of the vehicle 100 may be performed.

The unparking module may receive a signal from an external device via the transceiver 201, and provide a control signal to the vehicle driving module to perform the unparking of the vehicle 100.

The parking module may perform parking of the vehicle 100.

The parking module may receive navigation information from the navigation module, and provide a control signal to the vehicle driving module to perform the parking of the vehicle 100.

In the parking module, object information may be provided from the object detector 204, and a control signal may be provided to the vehicle driving module, so that the parking of the vehicle 100 may be performed.

The parking module may receive a signal from an external device via the transceiver 201, and provide a control signal to the vehicle driving module so as to perform the parking of the vehicle 100.

The navigation module may provide the navigation information to the controller 202. The navigation information may include at least one of map information, set destination information, route information according to destination setting, information about various objects on the route, lane information, or current location information of the vehicle.

The navigation module may provide the controller 202 with a parking lot map of the parking lot entered by the vehicle 100. When the vehicle 100 enters the parking lot, the controller 202 receives the parking lot map from the navigation module, and projects the calculated route and fixed identification information on the provided parking lot map so as to generate the map data.

The navigation module may include a memory. The memory may store navigation information. The navigation information may be updated by information received through the transceiver 201. The navigation module may be controlled by a built-in processor, or may be operated by receiving an external signal, for example, a control signal from the controller 202, but the present disclosure is not limited to this example.

The driving module of the operator 207 may be provided with the navigation information from the navigation module, and may provide a control signal to the vehicle driving module so that driving of the vehicle 100 may be performed.

The sensor 208 may sense the state of the vehicle 100 using a sensor mounted on the vehicle 100, that is, a signal related to the state of the vehicle 100, and obtain movement route information of the vehicle 100 according to the sensed signal. The sensor 208 may provide the obtained movement route information to the controller 202.

The sensor 208 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 208 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 208 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS).

The sensor 208 may generate vehicle state information based on sensing data. The vehicle state information may be information generated based on data sensed by various sensors included in the inside of the vehicle.

Vehicle state information may include, for example, attitude information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, interior temperature information of the vehicle, interior humidity information of the vehicle, pedal position information, or vehicle engine temperature information.

The storage 209 is electrically connected to the controller 202. The storage 209 may store basic data on each unit of the in-vehicle object monitoring apparatus, control data for controlling the operation of each unit of the in-vehicle object monitoring apparatus, and input/output data. The storage 209 may be various storage devices such as a ROM, a RAM, an EPROM, a flash drive, and a hard drive, in terms of hardware. The storage 209 may store various data for overall operation of the vehicle 100, such as a program for processing or controlling the controller 202, in particular driver propensity information. Here, the storage module may be formed integrally with the controller 202 or may be implemented as a sub-component of the controller 202.

The in-vehicle image monitoring apparatus 210 may receive the first image and the second image from the first camera and the second camera which photograph the inside of the vehicle, respectively and monitor the inside of the vehicle based on the first image and the second image. The in-vehicle image monitoring apparatus 210 may include an interface, a processor, and a memory, which will be described in more detail below with reference to FIG. 4. Here, the interface may be included in the transceiver 201, the processor may be included in the controller 202, and the memory may be included in the storage 209.

Figure 4:
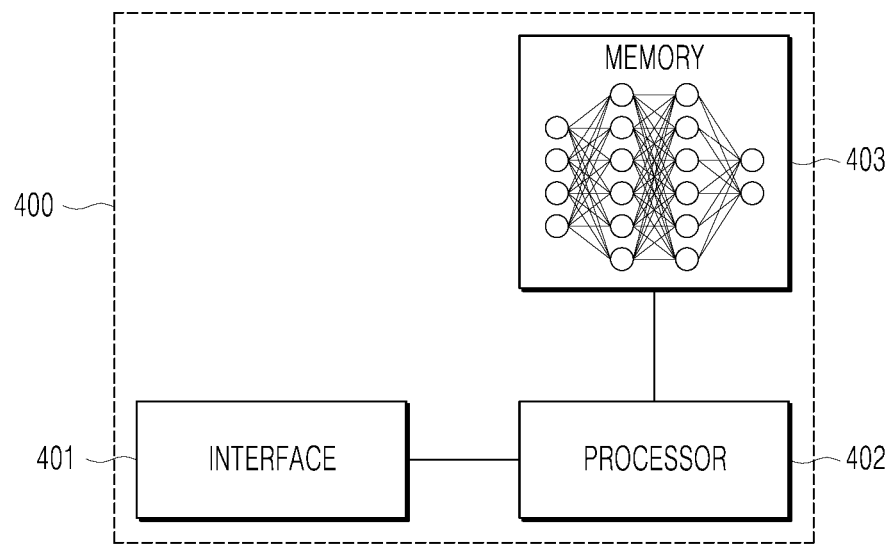
FIG. 4 is a view illustrating a configuration of an in-vehicle object monitoring apparatus according to an embodiment of the present disclosure.

FIG. 4 is a view illustrating a configuration of an in-vehicle object monitoring apparatus according to an embodiment of the present disclosure.

Referring to FIG. 4, an in-vehicle object monitoring apparatus 400 according to the embodiment of the present disclosure which monitors an object in the vehicle by using a first image and a second image includes an interface 401, a processor 402, and a memory 403.

The interface 401 may receive the first image generated by the first camera in the vehicle and the second image generated by the second camera in the vehicle. Here, the first camera and the second camera are installed in the same location (for example, the same location in the vehicle) to generate an image for the same surroundings or the same object and may be configured as one camera including various sensors. Further, the first camera and the second camera may be provided at the outside of the in-vehicle object monitoring apparatus 400, but are not limited thereto, and may be provided in the in-vehicle object monitoring apparatus 400.

The first image and the second image may have the same resolution.

In this case, the first image may be an image in which a pixel color varies based on a distance of the object (or the surrounding) spaced apart from a predetermined reference (for example, the first camera or a sensor in the first camera) and, for example, may be a depth image including depth information (for example, distance information for every pixel). In contrast, the second image may be a non-depth image which does not include depth information. As another example, the first image may be a three-dimensional image, and the second image may be a two-dimensional image.

The first camera, for example, may generate an ultrasonic image as the first image by using the ultrasonic sensor. The ultrasonic sensor may be useful for sensing a transparent material, liquid, a surface having a very high reflectivity, or a metal surface.

Further, the second camera, for example, may use an RGB image or an IR image as the second image by using an RGB sensor or an IR sensor. The IR sensor may be useful for sensing a cotton/leather material or when in a dark environment.

Further, the interface 401 may receive the first image and the second image at every predetermined time period from the first camera and the second camera.

The processor 402 in the in-vehicle object monitoring apparatus may generate an object type predicting algorithm, an object region estimating algorithm, and an object feature extracting algorithm to be stored in the memory 403, in i) a learning step.

Specifically, the processor 402 may train a neural network model to recognize a type (for example, a human, an animal, a beverage, or a snack) of the object from a plurality of first images (or second images) collected by the interface 401 to generate the object type predicting algorithm. The processor 402 may train the neural network model to set a variable area corresponding to the object in the first image (or the second image), based on the type of object, to generate the object region estimating algorithm. Further, the processor 402 may train the neural network model to recognize first feature information associated with the first image and second feature information associated with the second image, based on a category (for example, an active object or a passive object) in which the type of the image (for example, a first image and a second image) and the type of the object are classified to generate the object feature extracting algorithm.

The processor 402 may generate the object type predicting algorithm, the object region estimating algorithm, and the object feature extracting algorithm, as one algorithm.

Next, in ii) an inferring step, when the first image generated by the first camera and the second image generated by the second camera are received through the interface 401, the processor 402 may determine whether there is an object in each of the first image and the second image. When it is determined that there is an object in each of the first image and the second image (that is, when an object is extracted), the processor 402 may extract the first feature information about the object from the first image, extract the second feature information about the object from the second image, and recognize a state of the object based on the first feature information and the second feature information. Here, the state of the object may include a shape of the object and detailed information of the object (for example, ears, eyes, mouth, and nose of a human or a brand name of an object) and may further include a position of the object.

In this case, the processor 402 may apply the object type predicting algorithm in the memory 403 to the first image and the second image to predict the type of the object (for example, a human, an animal, a beverage, and a snack) and apply the object region estimating algorithm in the memory 403 to the predicted type of object together with the first image and the second image to estimate the variable region (that is, a region corresponding to the object) of the object. The processor 402 may apply the object feature extracting algorithm in the memory 403 to the estimated variable region of the object to extract the first feature information and the second feature information. Here, the object type predicting algorithm may be a neural network model which is trained to recognize the type of the object from at least one of the collected first image and second image. The object region estimating algorithm may be a neural network model which is trained to set the variable region corresponding to the object in the image, based on the type of the object. Further, the object feature extracting algorithm may be a neural network model which is trained to recognize first feature information associated with the first image and second feature information associated with the second image, based on the type of the image (for example, the first image and the second image) and the category (for example, an active object or a passive object) in which the type of object is classified.

In accordance with the type of the object classified as being an active object (for example, a human or an animal) capable of moving, the processor 402 may extract the shape of the object in the first image and the first point (that is, a pixel position) for ears, eyes, mouth, and nose of the object. In this case, the processor 402 may use skeletonization information and extract the shape of the object and the first point (that is, a pixel position) for ears, eyes, mouth, and nose of the object.

The processor 402 may extract the second point (that is, a pixel position) for ears, eyes, mouth, and nose of the object in the second image as the second feature information. Next, the processor 402 may recognize the state of the object by replacing an image corresponding to the first point in the first image with an image corresponding to the second point in the second image. In this case, the processor 402 may further extract the position of the object as the first feature information and further recognizes the position of the object as the state of the object.

For example, in accordance with the type of the object in the driving vehicle predicted as being a driver, based on the first image and the second image, when the driver gazing is recognized as the state of the object and is out of a predetermined range (for example, field of vision for driving, set left and right angles, upper and lower angles) for a first predetermined period of time or when the driver closes his/her eyes for the first predetermined period of time (that is, it may be determined as a driving in a drowsy state), the processor 402 may generate an accident risk warning.

As another example, the processor 402 may further recognize a state of a portable terminal (for example, a smartphone or a tablet PC) of the driver as the state of the object from the first image and the second image. When the gaze of the driver is directed to the portable terminal for a second predetermined period of time (which may be different from the first time), the processor 402 may issue the accident risk warning to cause the driver to focus on driving rather than the portable terminal 702.

Further, based on the type of the object, which is the driver, in the driving vehicle, whether the gaze of the driver, which is recognized as the state of the object, is directed to the display in the vehicle, and a direction of the head of the driver (also, whether the driver lowers his/her head), the processor 402 may control a backlight power source of the display, based on the first image and the second image.

Specifically, when the gaze of the driver is, for example, directed to the display in the vehicle and the driver leans his/her head downward (or when the driver lowers his/her head at a predetermined angle or more), the processor 402 may turn on the backlight power source of the display. In contrast, when the gaze of the driver is, for example, not directed to the display and the driver does not lower his/her head (or the driver does not lower his/her head at a predetermined angle or more, or looks straight ahead), the in-vehicle object monitoring apparatus may turn off the backlight power source of the display.

In accordance with the type of the object classified as being a passive object not capable of moving (for example, a beverage, a snack, or a portable terminal), the processor 402 may extract the shape of the object and the first point (for example, a pixel position) for unique information (for example, a brand name) of the object as the first feature information, and extract the second point corresponding to the unique information of the object in the second image as the second feature information. Next, the processor 402 may replace an image corresponding to the first point in the first image with an image corresponding to the second point (that is, the pixel position) in the second image to recognize the state of the object. In this case, the processor 402 may further extract the position of the object as the first feature information and further recognize the position of the object as the state of the object.

When the object in the first image and the object in the second image are composed, the processor 402 matches the first point in the first image with the second point in the second image, pixel for pixel, to replace an image corresponding to the first point with an image corresponding to the second point. The processor 402 does not match the entire image pixel for pixel, but instead matches an important partial region of the image pixel for pixel, so that the state of the object may be more promptly and conveniently recognized.

When the category (that is, an active object or a passive object) of the type of the object is classified, the processor 402 may use a category classification table for every type of object or a classifying algorithm (that is, a neural network model trained to classify the object as an active object or a passive object based on the type of the object), which is stored in advance in the memory 403.

Further, when it is confirmed that an object located in a predetermined space (for example, a snack bar) in the vehicle moves out of the space, the processor 402 may recognize the state (for example, a beverage C (lemon flavor)) of the moved object.

In accordance with the object disposed in the space not satisfying a reference set for every type (for example, cola, cider, snack A, snack B, or beverage C (lemon flavor)), the processor 402 provides, identification information of the object corresponding to the type which does not satisfy the reference, to a shop terminal in a shop located within a distance set with respect to the vehicle, and causes a drone, which is installed in the vehicle, to move to the shop to obtain a product corresponding to the identification information of the object and supply the product to the vehicle. Accordingly, the processor 402 constantly maintains an amount of the products disposed in the predetermined space (for example, a snack bar) in the vehicle to allow the user to conveniently use the product in the space.

The processor 402 checks a battery capacity of the drone, and when the drone is capable of moving back and forth to the shop based on the battery capacity, the processor moves the drone to the shop so that the drone can stably return to the vehicle without depleting the battery.

The processor 402 may select a shop included in a route on which the vehicle travels, based on at least one of a traveling speed of the vehicle or a time duration of the drone making a round trip, and provide identification information of the object to a shop terminal of the selected shop. Therefore, the processor 402 may adjust a position in the route where the vehicle travels and a position of the drone which returns from the shop to be within a predetermined distance to minimize a moving distance of the drone.

In the memory 403, the object type predicting algorithm, the object region estimating algorithm, and the object feature extracting algorithm, which are utilized to recognize the state of the object, may be stored.

The memory 403 may perform a function of temporarily or permanently storing data processed by the processor 402. Here, the memory 403 may include magnetic storage media or flash storage media, but the scope of the present disclosure is not limited thereto. The memory 403 may include an embedded memory and/or an external memory and also include a volatile memory such as a DRAM, an SRAM, or an SDRAM; a non-volatile memory such as one time programmable ROM (OTPROM), a PROM, an EPROM, an EEPROM, a mask ROM, a flash ROM, an NAND flash memory, or an NOR flash memory; a flash drive such as an SSD, a compact flash (CF) card, an SD card, a micro-SD card, a mini-SD card, an XD card, or a memory stick; or a storage drive such as an HDD.

Figure 5:
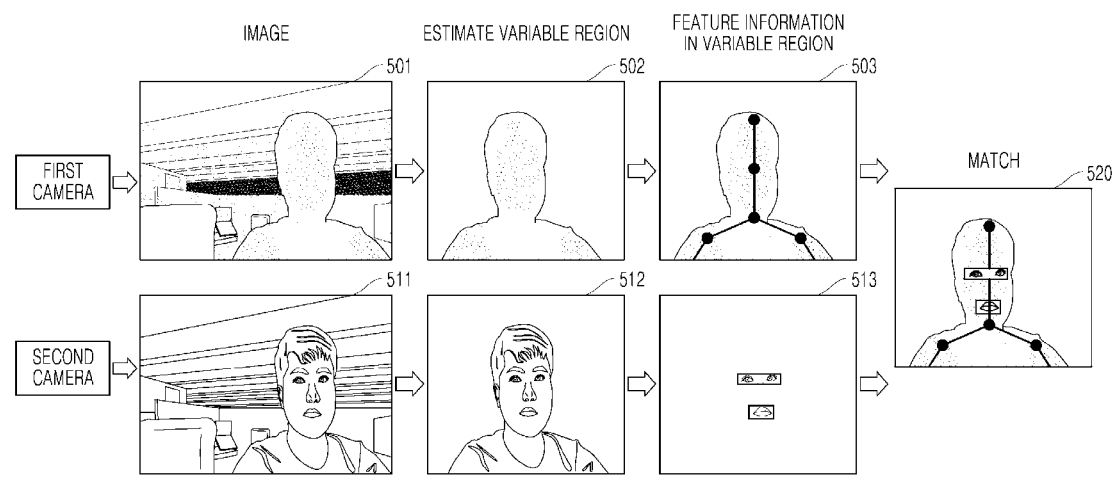
FIG. 5 is a view illustrating an example of recognizing a state of an object when an object is an active object in an in-vehicle object monitoring apparatus according to an embodiment of the present disclosure.

FIG. 5 is a view illustrating an example of recognizing a state of an object when an object is an active object in an in-vehicle object monitoring apparatus according to an embodiment of the present disclosure.

Referring to FIG. 5, the in-vehicle object monitoring apparatus may apply the object type predicting algorithm to a first image 501 received from the first camera (for example, an ultrasonic camera) to predict the type of the object (for example, a human), apply the object region estimating algorithm to the predicted type of the object together with the first image and the second image to estimate a variable region 502 of the object, and apply the object feature extracting algorithm to the variable region 502 of the object to extract first feature information 503. In this case, in accordance with the type of the object predicted as being "human," the in-vehicle object monitoring apparatus may classify the type of the object as being an active object capable of moving and extract the shape of the object and the first point (a pixel position) for eyes, ears, mouth, and nose of the object in the first image 501, as the first feature information 503.

Further, the in-vehicle object monitoring apparatus may apply the object type predicting algorithm to a second image 511 received from the second camera (for example, an RGB camera or an IR camera) to predict the type of the object (for example, a human), apply the object region estimating algorithm to the predicted type of the object together with the first image and the second image to estimate a variable region 512 of the object, and apply the object feature extracting algorithm to the estimated variable region of the object to extract second feature information 513. In this case, in accordance with the type of the object predicted as being "human," the in-vehicle object monitoring apparatus may classify the type of the object as being an active object capable of moving and extract the second point corresponding to eyes, ears, mouth, and nose of the object in the second image 511, as the second feature information 513.

The in-vehicle object monitoring apparatus may recognize a state 620 of the object based on first feature information 603 and second feature information 613 for the object. Specifically, the in-vehicle object monitoring apparatus may replace an image corresponding to the first point in a first image 601 with an image corresponding to the second point in a second image 611 to recognize the state 620 of the object.

Figure 6:
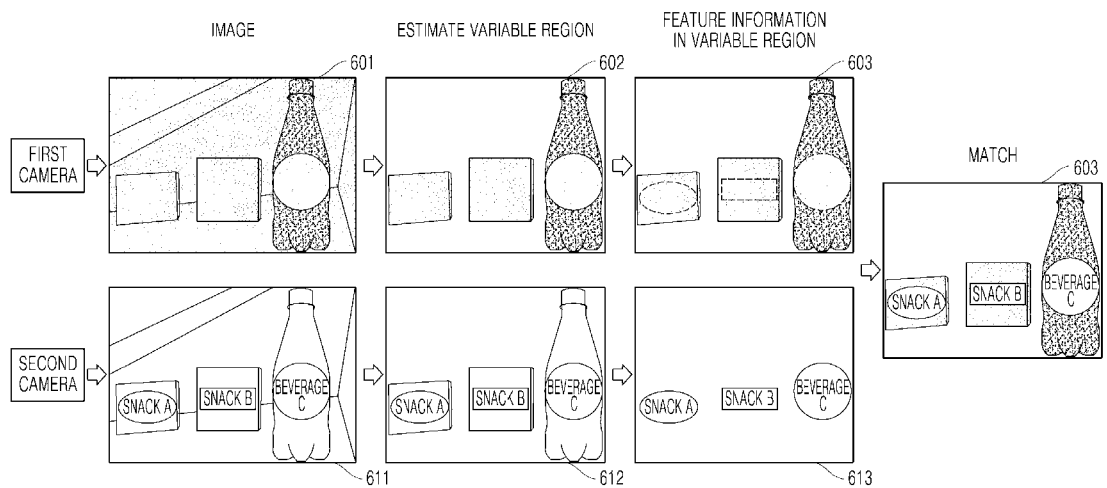
FIG. 6 is a view illustrating an example of recognizing a state of an object when an object is a passive object in an in-vehicle object monitoring apparatus according to an embodiment of the present disclosure.

FIG. 6 is a view illustrating an example of recognizing a state of an object when an object is a passive object in an in-vehicle object monitoring apparatus according to an embodiment of the present disclosure.

Referring to FIG. 6, the in-vehicle object monitoring apparatus may apply the object type predicting algorithm to the first image 601 received from the first camera (for example, an ultrasonic camera) to predict the type of the object (for example, a snack or a beverage), apply the object region estimating algorithm to the predicted type of the object together with the first image and the second image to estimate a variable region 602 of the object, and apply the object feature extracting algorithm to the variable region 602 of the object to extract the first feature information 603. In this case, in accordance with the type of the object predicted as being a "snack or beverage," the in-vehicle object monitoring apparatus may classify the type of the object as being a passive object not capable of moving and extract the shape of the object in the first image 601 and the first point (pixel position) for unique information (snack A, snack B, and beverage C) of the object as the first feature information 603.

Further, the in-vehicle object monitoring apparatus may apply the object type predicting algorithm to the second image 611 received from the second camera (for example, an RGB camera or an IR camera) to predict the type of the object (for example, snack or beverage), apply the object region estimating algorithm, to the predicted type of the object together with the first image and the second image to estimate a variable region 612 of the object, and apply the object feature extracting algorithm to the estimated variable region of the object to extract the second feature information 613. In this case, in accordance with the type of the object predicted as being a "snack or beverage," the in-vehicle object monitoring apparatus may classify the type of the object as being an active object capable of moving and extract the second point corresponding to eyes, ears, mouth, and nose of the object in the second image 611, as the second feature information 613.

The in-vehicle object monitoring apparatus may recognize the state 620 of the object based on the first feature information 603 and the second feature information 613 for the object. Specifically, the in-vehicle object monitoring apparatus may replace an image corresponding to the first point in the first image 601 with an image corresponding to the second point in the second image 611 to recognize the state 620 of the object.

Figure 7:
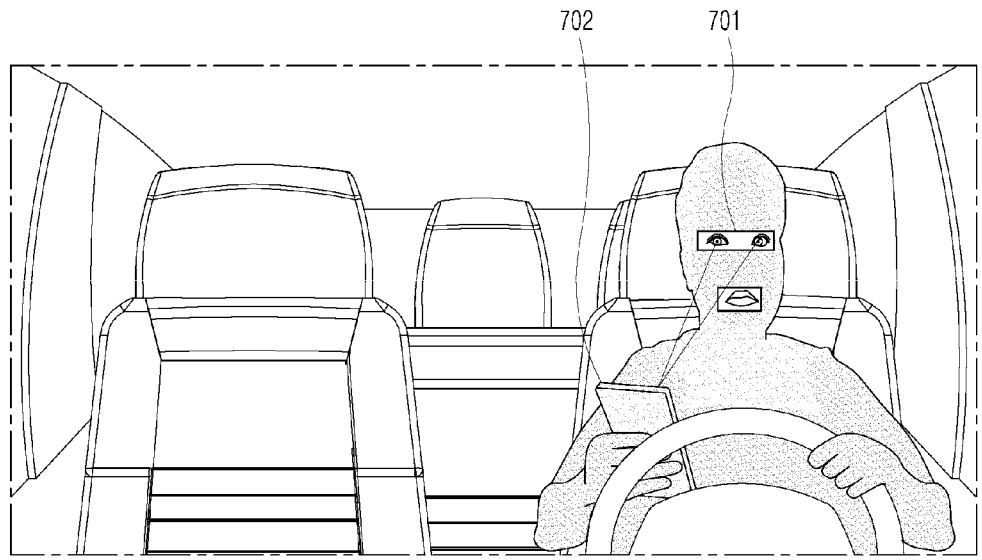
FIG. 7 is a view illustrating an example of preventing an accident in advance by monitoring a state of a driver in an in-vehicle object monitoring apparatus according to an embodiment of the present disclosure.

FIG. 7 is a view illustrating an example of preventing an accident in advance by monitoring a state of a driver in an in-vehicle object monitoring apparatus according to an embodiment of the present disclosure.

Referring to FIG. 7, the in-vehicle object monitoring apparatus may receive the first image and the second image from the ultrasonic camera and the RGB camera (or IR camera) of the traveling vehicle and perform driver state monitoring (DSM) based on the received first image and second image.

The in-vehicle object monitoring apparatus may recognize the state of the driver as the state of the object from the first image and the second image. In this case, when a gaze 701 of the driver is out of a predetermined range (for example, pupils of the eyes of the driver are out of a field of vision for traveling) for a first predetermined period of time (for example, five seconds), the in-vehicle object monitoring apparatus may issue an accident risk warning to prevent a car accident in advance.

In this case, the in-vehicle object monitoring apparatus may further recognize the driver holding a portable terminal 702, as being the state of the object, from the first image and the second image. When the gaze 701 of the driver is directed to the portable terminal 702 for a second time (which may be shorter than the first time, for example, three seconds), the in-vehicle object monitoring apparatus may issue an accident risk warning to cause the driver to focus on driving the vehicle, rather than the portable terminal 702.

Figure 8:
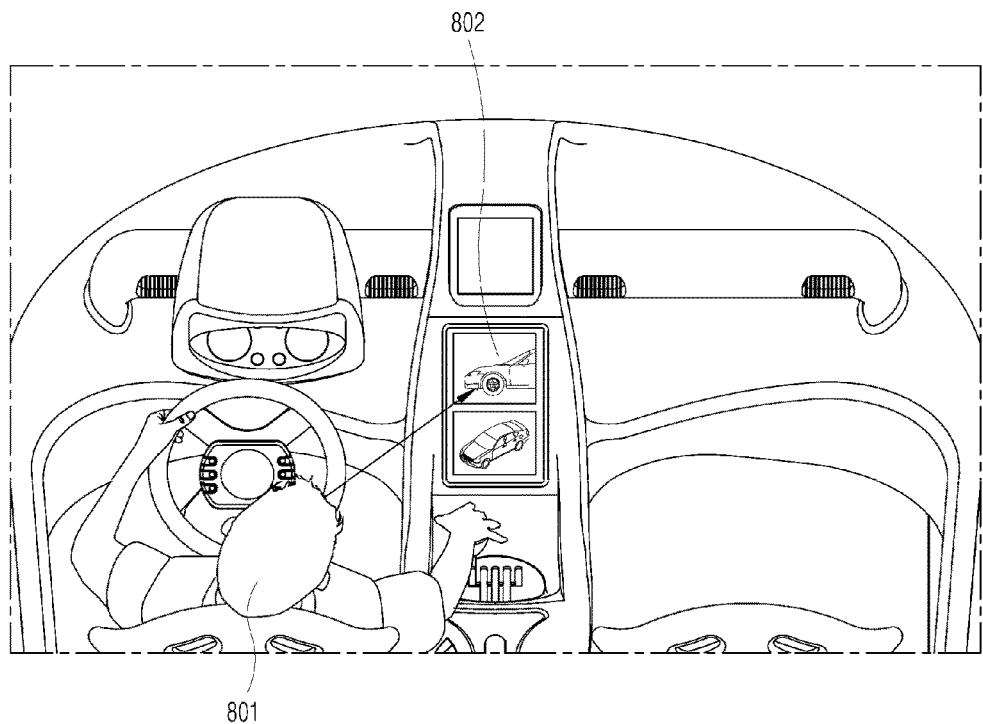
FIGS. 8 and 9 are views illustrating an example of controlling a power source of a component in a vehicle by monitoring a state of a driver in an in-vehicle object monitoring apparatus according to an embodiment of the present disclosure.
Figure 9:
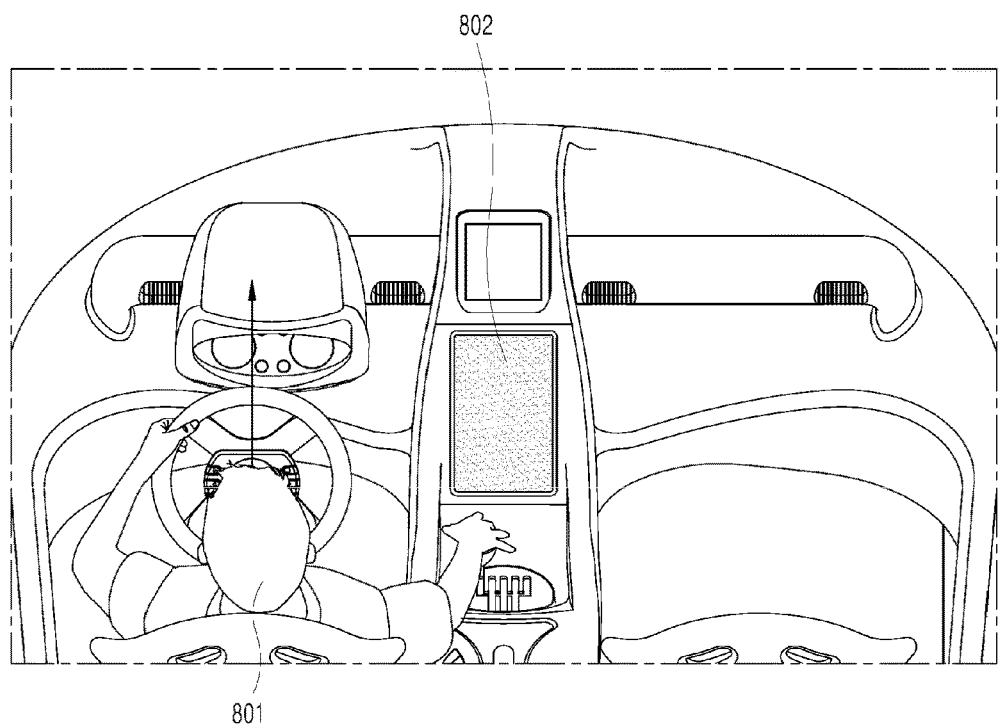

FIGS. 8 and 9 are views illustrating an example of controlling a power source of a component in a vehicle by monitoring a state of a driver in an in-vehicle object monitoring apparatus according to an embodiment of the present disclosure.

Referring to FIGS. 8 and 9, the in-vehicle object monitoring apparatus may monitor the state of the driver to control a power source of a component (for example, a display) in the vehicle. In this case, the in-vehicle object monitoring apparatus may control the power source of the component (for example, a display) in the vehicle, based on whether the gaze of the driver is directed to the display in the vehicle and a direction of the head of the driver.

Specifically, the in-vehicle object monitoring apparatus may receive the first image and the second image, respectively, from the ultrasonic camera and the RGB camera (or the IR camera) of the traveling vehicle.

The in-vehicle object monitoring apparatus may recognize a state of a driver 801 as the state of the object, from the first image and the second image. In this case, when the gaze of the driver 801 is directed to a display 802 in the vehicle, and the driver 801 lowers his/her head downward (or when the driver lowers his/her head at a predetermined angle or more), the in-vehicle object monitoring apparatus may turn on the backlight power source of the display 802. In contrast, when the gaze of the driver 801 is not directed to the display 802 and the driver 801 does not lower his/her head (or the driver does not lower his/her head at a predetermined angle or more, or looks straight ahead), the in-vehicle object monitoring apparatus may turn off the backlight power source of the display 802.

That is, the in-vehicle object monitoring apparatus may accurately recognize the state of the driver 801 by using different types of images and turn on the backlight power source of the display only when the driver 801 uses the display in the vehicle to reduce the battery consumption.

Figure 10:
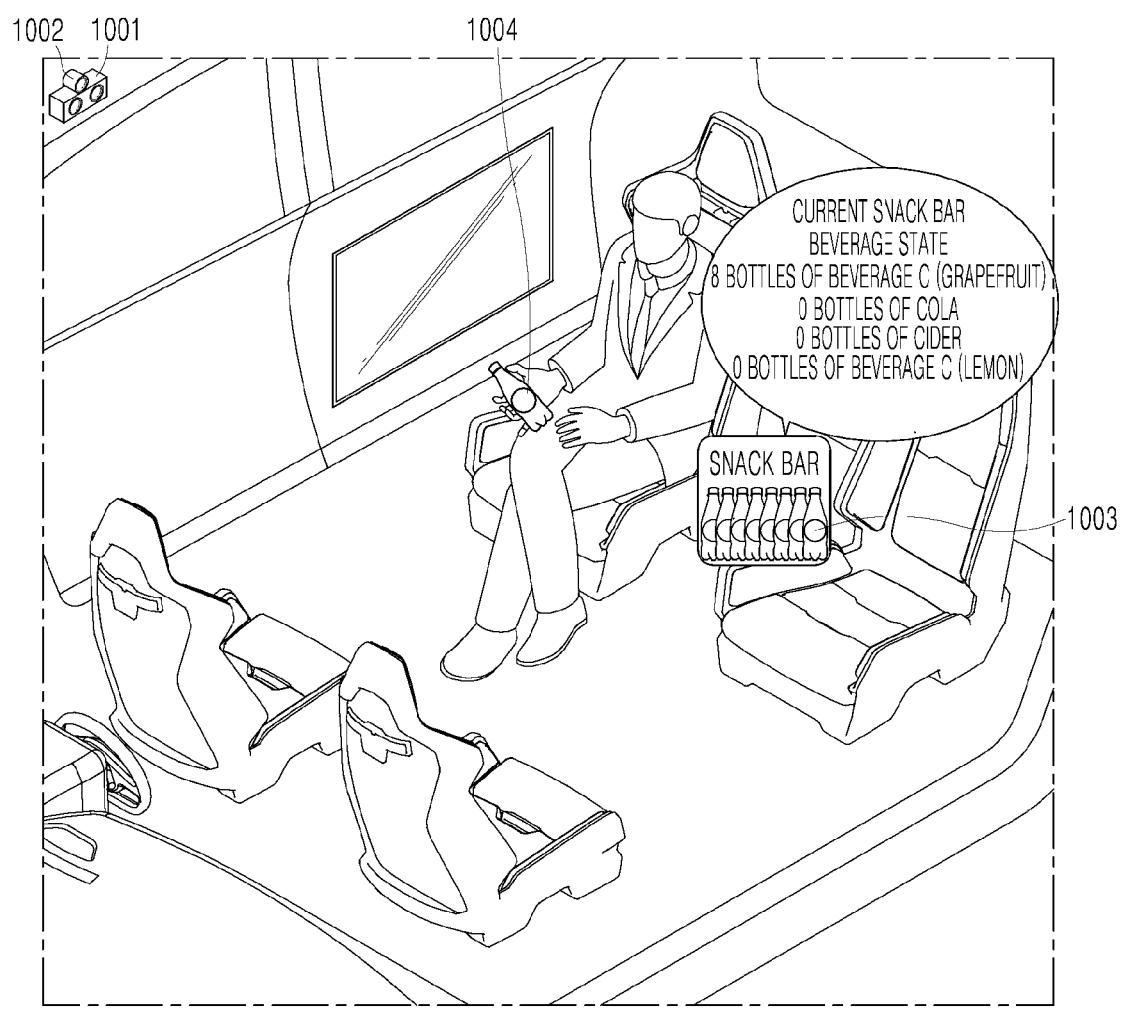
FIG. 10 is a view illustrating an example of recognizing a state of a product present in a predetermined space in a vehicle in an in-vehicle object monitoring apparatus according to an embodiment of the present disclosure.

FIG. 10 is a view illustrating an example of recognizing a state of a product present in a predetermined space in a vehicle in an in-vehicle object monitoring apparatus according to an embodiment of the present disclosure.

Referring to FIG. 10, the in-vehicle object monitoring apparatus receives the first image and the second image from an ultrasonic camera 1001 and a RGB camera (or the IR camera) 1002 in the vehicle at every predetermined time period, respectively.

When it is confirmed that an object located in a snack bar 1003 in a vehicle moves out of the snack bar 1003, based on the first image and the second image which are periodically received, the in-vehicle object monitoring apparatus may recognize the state of the moved object.

For example, as the passenger takes out the product provided in the snack bar 1003, when it is confirmed that the object located in the snack bar 1003 moves out of the snack bar 1003 based on the first image and second image, the in-vehicle object monitoring apparatus may recognize beverage C (lemon flavor) 1004 as the state of the move object.

Figure 11:
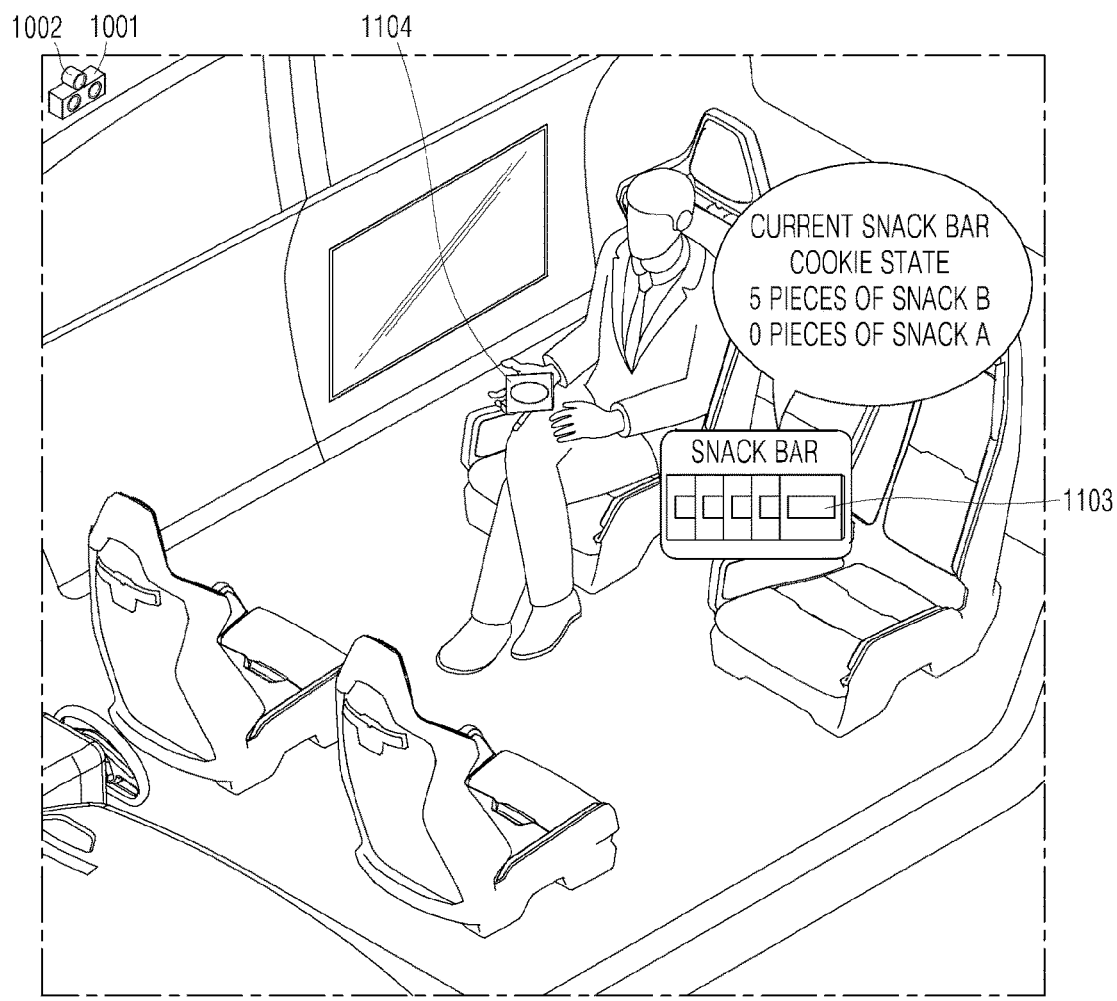
FIG. 11 is a view illustrating another example of recognizing a state of a product present in a predetermined space in a vehicle in an in-vehicle object monitoring apparatus according to an embodiment of the present disclosure.
Figure 12:
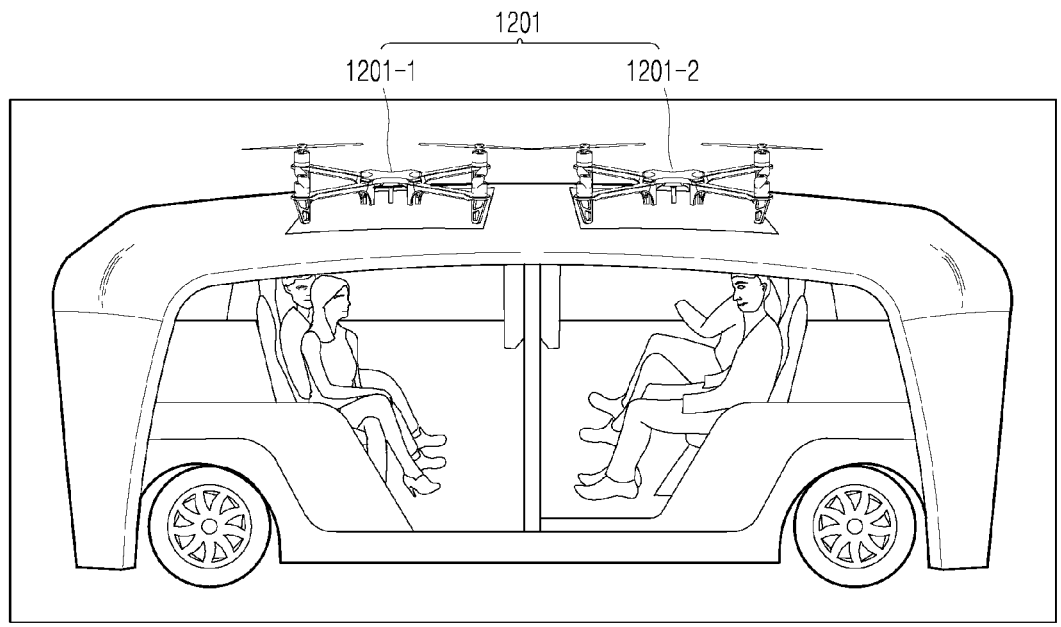
FIGS. 12 to 15 are views illustrating an example of managing an amount of products present in a predetermined space in a vehicle in an in-vehicle object monitoring apparatus according to an embodiment of the present disclosure.
Figure 13:
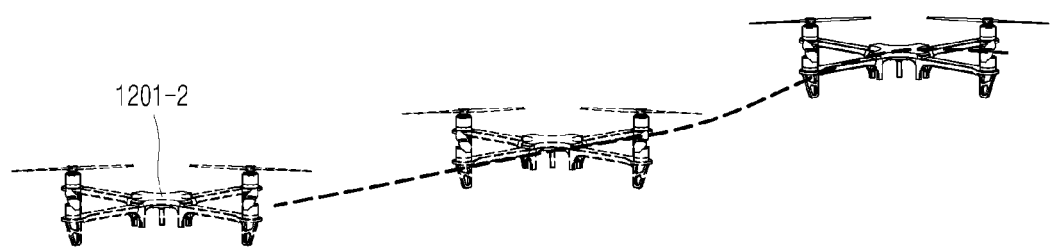
Figure 14:
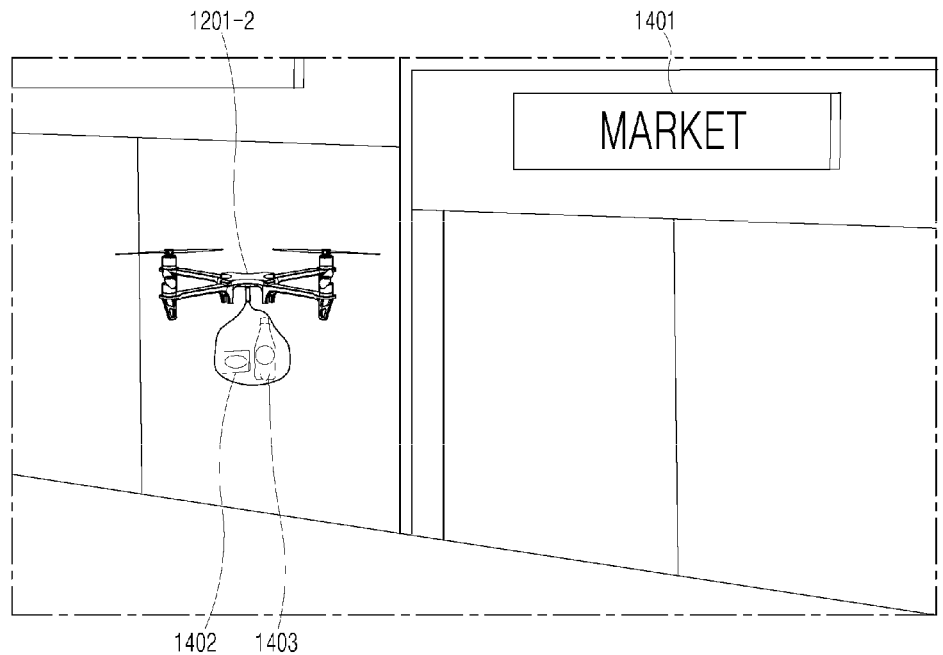
Figure 15:
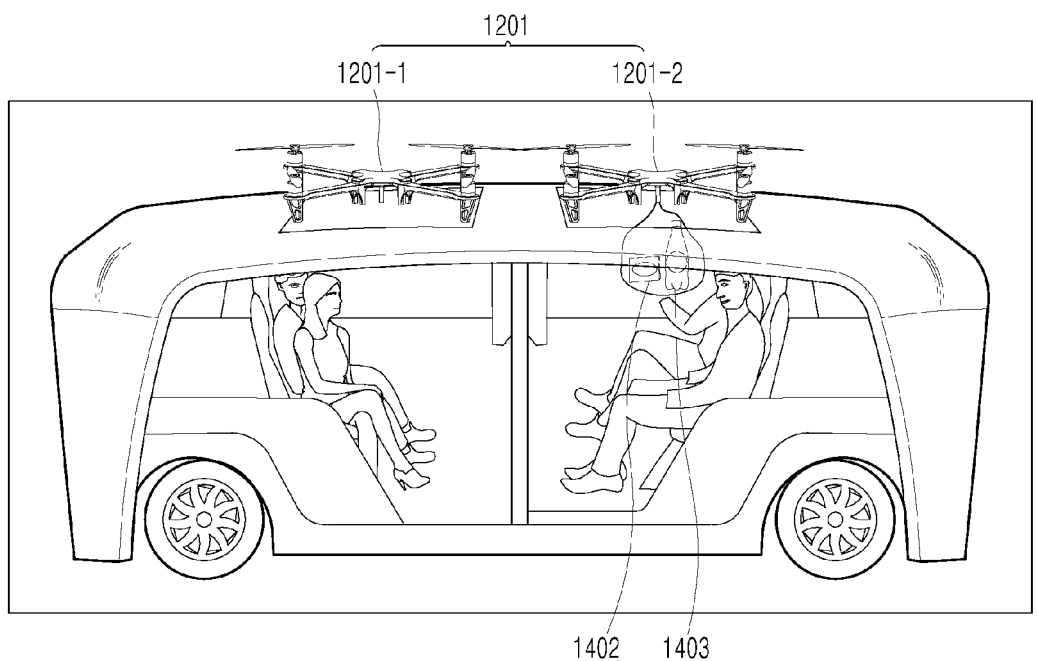

FIG. 11 is a view illustrating another example of recognizing a state of a product present in a predetermined space in a vehicle in an in-vehicle object monitoring apparatus according to an embodiment of the present disclosure.

Referring to FIG. 11, the in-vehicle object monitoring apparatus may receive the first image and the second image from a ultrasonic camera 1101 and a RGB camera (or the IR camera) 1102 in the vehicle at every predetermined time period, respectively.

When it is confirmed that an object located in a snack bar 1103 in a vehicle moves out of the snack bar 1103, based on the first image and the second image which are periodically received, the in-vehicle object monitoring apparatus may recognize the state of the moved object.

For example, in accordance with the passenger taking out the product provided in the snack bar 1103, when it is confirmed that the object located in the snack bar 1103 moves out of the snack bar 1103 based on the first image and second image, the in-vehicle object monitoring apparatus recognizes snack A 1104 as the state of the moved object.

FIGS. 12 to 15 are views illustrating an example of managing an amount of products present in a predetermined space in a vehicle in an in-vehicle object monitoring apparatus according to an embodiment of the present disclosure, respectively.

Referring to FIGS. 12 to 15, the in-vehicle object monitoring apparatus may receive the first image and the second image from the ultrasonic camera and the RGB camera (or the IR camera) in the vehicle at every predetermined time period.

When it is confirmed that the object located in the snack bar in the vehicle moves out of the snack bar, based on the first image and the second image which are periodically received, the in-vehicle object monitoring apparatus may recognize the state of the moved object. In this case, in accordance with the object disposed in the space not satisfying a reference set for every type (for example, cola, cider, snack A, snack B, or beverage C (lemon flavor)), the in-vehicle object monitoring apparatus may again fill the snack bar with the object which does not satisfy the reference.

In this case, the in-vehicle object monitoring apparatus may use a drone 1201, which is installed above the vehicle, to supply a product corresponding to the object which does not satisfy the reference to the vehicle (or the snack bar in the vehicle).

Specifically, the in-vehicle object monitoring apparatus may move a drone 1201-2 installed in the vehicle to a shop 1401 and provide identification information of the object (for example, snack A or beverage C (lemon flavor)) corresponding to the type which is insufficient to a shop terminal in the shop 1401. The in-vehicle object monitoring apparatus may allow the drone 1201-2 to acquire products 1402 and 1403 corresponding to the identification information of the object from the shop 1401, and supply the product to the vehicle (or the snack bar in the vehicle) to be seated in a position provided in the vehicle.

The shop 1401 may be a shop located within a predetermined distance from the vehicle or a shop included in a route where the vehicle travels.

The in-vehicle object monitoring apparatus may charge a battery of the drone 1201 so that the battery capacity of the drone 1201 installed in the vehicle becomes more than a set battery capacity. Therefore, an environment which allows the drone 1201 to deliver the product at any time may be achieved.

Figure 16:
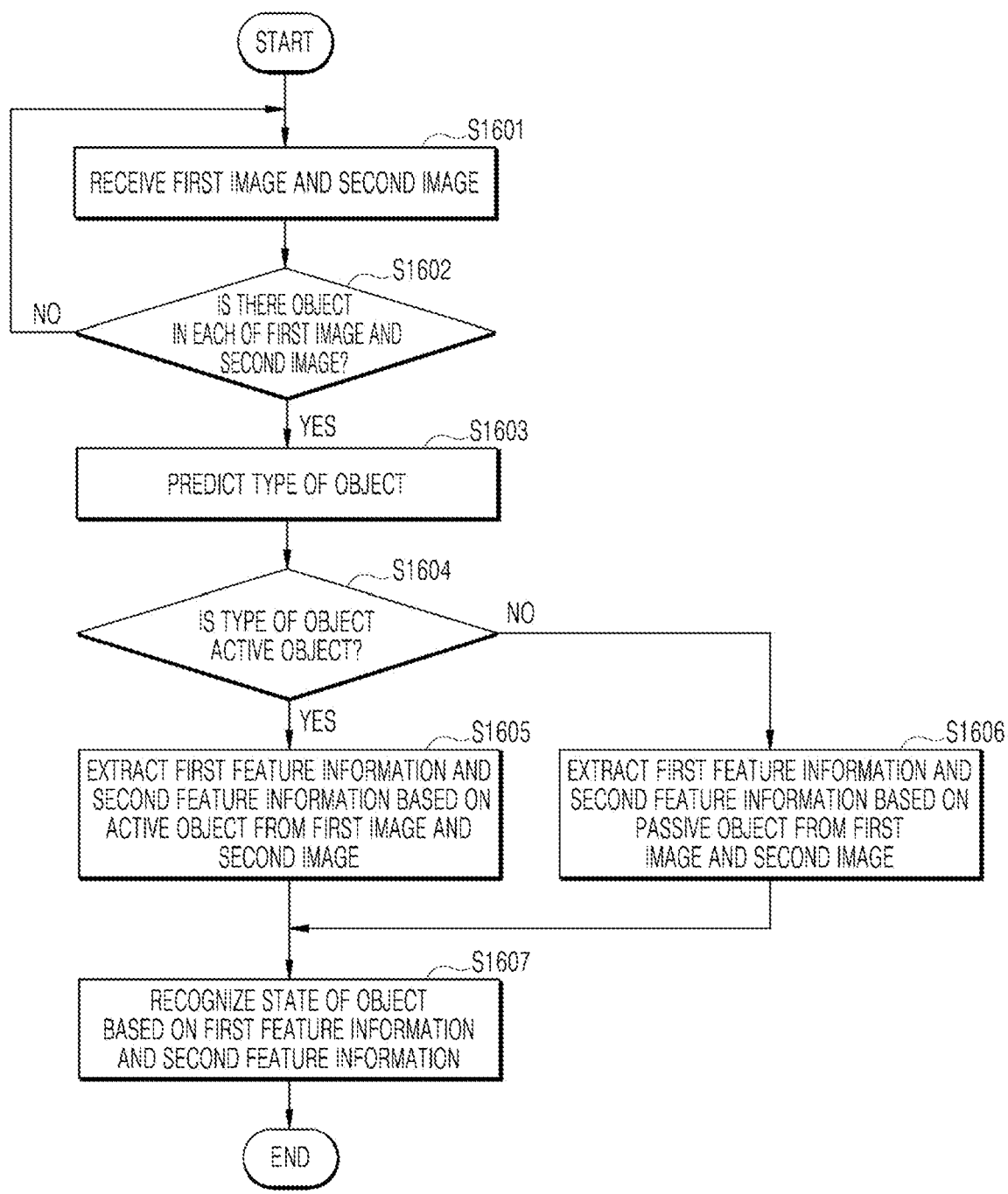
FIG. 16 is a flowchart illustrating an in-vehicle object monitoring method according to an embodiment of the present disclosure.

FIG. 16 is a flowchart illustrating an in-vehicle object monitoring method according to an embodiment of the present disclosure. Here, an in-vehicle object monitoring apparatus which embodies an in-vehicle object monitoring method may generate an object type predicting algorithm, an object region estimating algorithm, and an object feature extracting algorithm to store the algorithms in the memory.

The object type predicting algorithm is a neural network model which is trained to recognize a type of object from at least one of the collected first image and second image. The object region estimating algorithm is a neural network model which is trained to set a variable region corresponding to the object in the image, based on the type of object.

Further, the object feature extracting algorithm may be a neural network model which is trained to recognize any one feature information of the first feature information and the second feature information in a variable region corresponding to the object, based on a category in which the type of the image and the type of the object are classified.

Referring to FIG. 16, in step S1601, the in-vehicle object monitoring apparatus may receive a first image generated by a first camera in the vehicle and a second image generated by a second camera in the vehicle. In this case, the first camera may use an ultrasonic sensor to generate an ultrasonic image as the first image, and the second camera may use an RGB sensor or an IR sensor to generate an RGB image or an IR image as the second image.

In step S1602, the in-vehicle object monitoring apparatus may determine whether there is an object in each of the first image and the second image. As a determination result, when it is determined that there is an object in each of the first image and the second image, in step S1603, the in-vehicle object monitoring apparatus may apply the object type predicting algorithm to the first image and the second image to predict the type of the object.

In step S1604, the in-vehicle object monitoring apparatus may confirm whether the predicted type of the object is classified as being an active object or a passive object and as a confirmation result, when the type of the object is classified as being an active object, in step S1605, the in-vehicle object monitoring apparatus may extract first feature information and second feature information based on the active object, from the first image and the second image. Specifically, the in-vehicle object monitoring apparatus may apply the object region estimating algorithm to the predicted type of object together with the first image and the second image to estimate a variable region of the object. The in-vehicle object monitoring apparatus may apply the object feature extracting algorithm to the estimated variable region of the object to extract the shape of the object in the first image and a first point corresponding to eyes, ears, mouth, and nose of the object as the first feature information, and extract a second point corresponding to the eyes, ears, mouth, and nose of the object in the second image as the second feature information.

As the confirmation result, when the type of the object is classified as being a passive object, in step S1606, the in-vehicle object monitoring apparatus may extract first feature information and second feature information based on the passive object, from the first image and the second image. Specifically, the in-vehicle object monitoring apparatus may apply the object region estimating algorithm to the predicted type of the object together with the first image and the second image to estimate a variable region of the object. The in-vehicle object monitoring apparatus may apply the object feature extracting algorithm to the estimated variable region of the object to extract the shape of the object in the first image and a first point corresponding to unique information of the object as the first feature information, and extract a second point corresponding to unique information of the object in the second image as the second feature information.

In step S1607, the in-vehicle object monitoring apparatus may recognize the state of the object based on the first feature information and the second feature information. In this case, the in-vehicle object monitoring apparatus may recognize the state of the object by replacing an image corresponding to the first point in the first image with an image corresponding to the second point in the second image.

In step S1604, the in-vehicle object monitoring apparatus may apply the object feature extracting algorithm to the estimated variable region of the object to extract the first feature information and the second feature information.

Thereafter, in accordance with the type of the object in the traveling vehicle estimated as being a driver, when the driver gazing is recognized as being the state of the object and is out of a predetermined range for a predetermined period of time, the in-vehicle object monitoring apparatus may issue an accident risk warning to prevent a car accident.

Further, based on the type of the object in the traveling vehicle being a driver, whether the gaze of the driver is directed to the display in the vehicle, and the direction of the head of the driver, the in-vehicle object monitoring apparatus may control the backlight power source of the display.

The in-vehicle object monitoring apparatus may receive the first image and the second image at every predetermined time period from the first camera and the second camera, and when it is confirmed that the object located in a predetermined space in the vehicle moves out of the space, may recognize the state of the moved object, based on the first image and the second image which are periodically received.

In accordance with the object disposed in the space not satisfying a reference set for every type, the in-vehicle object monitoring apparatus may provide, identification information of the object corresponding to the type which does not satisfy the reference, to a shop terminal in a shop located within a distance set with respect to the vehicle, and cause a drone, which is installed in the vehicle, to move to the shop to obtain a product corresponding to the identification information of the object and supply the product to the vehicle. In this case, the in-vehicle object monitoring apparatus may check a battery capacity of the drone and move the drone to the shop based on the drone being able to move back and forth to and from the shop on the basis of the battery capacity.

The in-vehicle object monitoring apparatus may select a shop included in a route on which the vehicle travels, based on at least one of a traveling speed of the vehicle or a time duration of the drone making a round trip, and provide identification information of the object to a shop terminal of the selected shop.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. An in-vehicle object monitoring apparatus which monitors an in-vehicle object by using a first image and a second image, the in-vehicle object monitoring apparatus comprising:
    an interface configured to receive a first image generated by a first camera in a vehicle and a second image generated by a second camera in the vehicle; and
    a processor configured to, when it is determined that there is an object in each of the first image and the second image, extract first feature information about the object from the first image, extract second feature information about the object from the second image, and recognize a state of the object based on the first feature information and the second feature information,
    wherein the first camera is configured to generate, by using an ultrasonic sensor, an ultrasonic image as the first image which includes depth information, and the second camera is configured to generate, by using an RGB (red, green, and blue) sensor or an infrared radiation (IR) sensor, an RGB image or an IR image as the second image which does not include depth information,
    wherein in accordance with the type of the object classified as being an active object capable of moving, the processor is configured to extract, as the first feature information, a shape of the object in the first image and first points corresponding to eyes, ears, mouth, and nose of the object, extract, as the second feature information, second points corresponding to eyes, ears, mouth, and nose of the object in the second image, and recognize the state of the object by replacing an image corresponding to at least one of the first points in the first image with an image corresponding to at least one of the second points in the second image, and
    wherein, based on the type of the object in the traveling vehicle predicted as being a driver and based on driver gazing being recognized as the state of the object and being out of a predetermined range for a predetermined period of time, the processor is configured to issue an accident risk warning.

2. The in-vehicle object monitoring apparatus according to claim 1, wherein the processor is configured to:
    apply an object type predicting algorithm to the first image and the second image to predict a type of the object,
    apply an object region estimating algorithm to the predicted type of the object together with the first image and the second image to estimate a variable region of the object, and
    apply an object feature extracting algorithm to the estimated variable region of the object to extract the first feature information and the second feature information.

3. The in-vehicle object monitoring apparatus according to claim 2, wherein:
    the object type predicting algorithm is a neural network model which is trained to recognize the type of the object from at least one of the collected first image or second image,
    the object region estimating algorithm is a neural network model which is trained to set the variable region corresponding to the object in the image based on the type of the object, and
    the object feature extracting algorithm is a neural network model which is trained to recognize any one of the first feature information or the second feature information in the variable region corresponding to the object, based on a category in which the type of the image and the type of the object are classified.

4. The in-vehicle object monitoring apparatus according to claim 1, wherein based on the type of the object in the traveling vehicle being a driver, whether the gaze of the driver is directed to a display in the vehicle, and a direction of the head of the driver, the processor is configured to control a backlight power source of the display.

5. The in-vehicle object monitoring apparatus according to claim 1, wherein in accordance with the type of the object classified as being a passive object not capable of moving, the processor is configured to:
    extract, as the first feature information, a shape of the object in the first image and a first point corresponding to unique information of the object,
    extract, as the second feature information, a second point corresponding to the unique information of the object in the second image, and
    recognize the state of the object by replacing an image corresponding to the first point in the first image with an image corresponding to the second point in the second image.

6. The in-vehicle object monitoring apparatus according to claim 5, wherein the unique information of the object is a brand name.

7. The in-vehicle object monitoring apparatus according to claim 1, wherein:
    the interface is configured to receive the first image and the second image at every predetermined period of time period from the first camera and the second camera, and
    when it is confirmed that the object, located in a space set in the vehicle, moves out of the space, based on the first image and the second image which are periodically received, the processor is configured to recognize the state of the moved object.

8. The in-vehicle object monitoring apparatus according to claim 7, wherein in accordance with the object disposed in the space not satisfying a reference set for every type, the processor is configured to:
    provide, identification information of the object corresponding to the type which does not satisfy the reference, to a shop terminal in a shop located within a distance set with respect to the vehicle; and cause a drone, which is installed in the vehicle, to move to the shop to obtain a product corresponding to the identification information of the object and supply the product to the vehicle.

9. The in-vehicle object monitoring apparatus according to claim 8, wherein the processor is configured to:
check a battery capacity of the drone, and
when it is determined that the drone is capable of moving back and forth to the shop based on the battery capacity, move the drone to the shop.

10. The in-vehicle object monitoring apparatus according to claim 8, wherein the processor is configured to:
select a shop included in a route on which the vehicle travels, based on at least one of a traveling speed of the vehicle or a time duration of the drone making a round trip, and
provide identification information of the object to a shop terminal of the selected shop.

11. A method for monitoring an in-vehicle object by using a first image and a second image, the in-vehicle object monitoring method comprising:
receiving a first image generated by a first camera in a vehicle and a second image generated by a second camera in the vehicle; and
in accordance with a determination that there is an object in each of the first image and the second image, extracting first feature information about the object from the first image, extracting second feature information about the object from the second image, and recognizing a state of the object based on the first feature information and the second feature information,
wherein the first camera is configured to generate, by using an ultrasonic sensor, an ultrasonic image as the first image which includes depth information, and the second camera is configured to generate, by using an RGB (red, green, and blue) sensor or an infrared radiation (IR) sensor, an RGB image or an IR image as the second image which does not include depth information,
wherein in accordance with the type of the object classified as being an active object capable of moving, the recognizing of a state of an object comprises:
extracting, as the first feature information, as the first feature information, a shape of the object in the first image and first points corresponding to eyes, ears, mouth, and nose of the object,
extracting, second points corresponding to eyes, ears, mouth, and nose of the object in the second image,
recognizing the state of the object by replacing an image corresponding to at least one of the first points in the first image with an image corresponding to at least one of the second points in the second image, and based on the type of the object in the traveling vehicle predicted as being a driver, and based on the driver gazing being recognized as the state of the object and being out of a predetermined range for a predetermined period of time, issuing an accident risk warning.

12. The in-vehicle object monitoring method according to claim 11, wherein the recognizing of a state of an object comprises:
predicting a type of the object by applying an object type predicting algorithm to the first image and the second image, respectively;
estimating a variable region of the object by applying an object region estimating algorithm to the predicted type of the object together with the first image and the second image; and
extracting the first feature information and the second feature information by applying an object feature extracting algorithm to the estimated variable region of the object, respectively.

13. The in-vehicle object monitoring method according to claim 11, wherein in accordance with the type of the object classified as being a passive object not capable of moving, the recognizing of a state of an object further comprises:
extracting, as the first feature information, a shape of the object in the first image and a first point corresponding to unique information of the object,
extracting, as the second feature information, a second point corresponding to the unique information of the object in the second image, and
recognizing the state of the object by replacing an image corresponding to the first point in the first image with an image corresponding to the second point in the second image.

14. The in-vehicle object monitoring method according to claim 11, wherein the recognizing of a state of an object further comprises:
when it is confirmed that the object, located in a space set in the vehicle, moves out of the space, based on the first image and the second image which are periodically received, recognizing the state of the moved object.

15. The in-vehicle object monitoring method according to claim 14, after the recognizing of a state of an object, in accordance with the object disposed in the space not satisfying a reference set for every type, further comprising:
providing, identification information of the object corresponding to the type which does not satisfy the reference, to a shop terminal in a shop located within a distance set from the vehicle; and
moving a drone installed in the vehicle to the shop to obtain a product corresponding to the identification information of the object and supply the product to the vehicle.

* * * * *